(12) United States Patent
Tamizkar (10) Patent No.: US 11,777,851 B2
(45) Date of Patent: *Oct. 3, 2023

(54) METHODS AND AN APPARATUS FOR ROUTING DATA PACKETS IN A NETWORK TOPOLOGY

(71) Applicant: Telia Company AB, Solna (SE)

(72) Inventor: Babak Tamizkar, Stockholm (SE)

(73) Assignee: TELIA COMPANY AB

( * ) Notice: Subject to any disclaimer, the term of this patent is extended or adjusted under 35 U.S.C. 154(b) by 0 days.

This patent is subject to a terminal disclaimer.

(21) Appl. No.: 17/232,585

(22) Filed: Apr. 16, 2021

(65) Prior Publication Data
US 2021/0377167 A1  Dec. 2, 2021

(30) Foreign Application Priority Data
May 27, 2020 (SE) .................................... 2050610-1

(51) Int. Cl.
*G06F 15/16* (2006.01)
*H04L 45/74* (2022.01)
(Continued)

(52) U.S. Cl.
CPC .......... *H04L 45/74* (2013.01); *H04L 12/4633* (2013.01); *H04L 45/12* (2013.01); *H04L 45/3065* (2013.01); *H04L 45/586* (2013.01)

(58) Field of Classification Search
CPC ..... H04L 45/74; H04L 12/4633; H04L 45/12; H04L 45/3065; H04L 45/586;
(Continued)

(56) References Cited

U.S. PATENT DOCUMENTS

| 9,942,148 B1 | 4/2018 | Sivaramakrishnan et al. |
| 2002/0069278 A1 | 6/2002 | Forslow |

(Continued)

FOREIGN PATENT DOCUMENTS

| EP | 2557854 A2 | 2/2013 |
| EP | 2557854 A3 | 11/2013 |

(Continued)

OTHER PUBLICATIONS

Route optimization for roaming heterogeneous multi-homed mobile networks Kumudu S. Munasinghe;Abbas Jamalipour 2010 4th International Conference on Signal Processing and Communication Systems Year: 2010 | Conference Paper | Publisher: IEEE (Year: 2010).*

(Continued)

*Primary Examiner* — Oscar A Louie
*Assistant Examiner* — Oluwatosin M Gidado
(74) *Attorney, Agent, or Firm* — Burr & Forman LLP; Jeffrey H. Kamenetsky, Esq.

(57) ABSTRACT

Enabling routing of traffic to/from a roaming host node roaming from a subnet of a home network to a visited network, the host node assigned an IP address in the home network, comprising configuring, in a router of the visited network, a subnet by assigning an IP address range to the subnet, which is in the same IP address range of the subnet of the home network; configuring a tunnel between a router of the home network and the router; configuring a static route to route traffic from a host node destined to the roaming host node; and configuring the router by applying a routing policy enabling the roaming host node to reply to received traffic from said host node received from a first interface and route traffic from the roaming host node through a network interconnecting the router of the visited network and the router of the home network.

16 Claims, 6 Drawing Sheets

(51) Int. Cl.
*H04L 12/46* (2006.01)
*H04L 45/12* (2022.01)
*H04L 45/302* (2022.01)
*H04L 45/586* (2022.01)

(58) Field of Classification Search
CPC ......... H04L 67/22; H04L 63/10; H04L 51/04; H04L 67/02; H04L 63/08; H04L 63/1483
USPC ........................................................ 709/238
See application file for complete search history.

(56) References Cited

U.S. PATENT DOCUMENTS

| | | | |
|---|---|---|---|
| 2002/0080752 A1* | 6/2002 | Johansson | H04L 61/5084 370/338 |
| 2004/0013118 A1 | 1/2004 | Borella | |
| 2005/0013280 A1 | 1/2005 | Buddhikot et al. | |
| 2006/0268834 A1 | 11/2006 | Bajic | |
| 2009/0129386 A1* | 5/2009 | Rune | H04L 12/4641 370/392 |
| 2012/0008630 A1 | 1/2012 | Ould-Brahim | |
| 2012/0106554 A1* | 5/2012 | Ng | H04L 12/4633 370/392 |
| 2012/0281630 A1 | 11/2012 | Liu et al. | |
| 2014/0169286 A1* | 6/2014 | Xu | H04W 8/02 370/329 |
| 2016/0380823 A1* | 12/2016 | Shen | H04L 45/00 370/254 |
| 2018/0123964 A1* | 5/2018 | Kore | H04L 43/0864 |
| 2018/0241823 A1 | 8/2018 | Dawani et al. | |
| 2019/0239125 A1* | 8/2019 | El-Rashidy | H04W 8/087 |

FOREIGN PATENT DOCUMENTS

| | | | | |
|---|---|---|---|---|
| EP | 3842966 A1 | * | 6/2021 | ............. G06F 21/31 |
| WO | WO-9967969 A1 | * | 12/1999 | ............ H04W 28/26 |
| WO | WO 03073707 A1 | | 9/2003 | |
| WO | WO 2014/1117475 A1 | | 8/2014 | |
| WO | WO-2014169782 A1 | * | 10/2014 | ......... G06F 9/45558 |

OTHER PUBLICATIONS

Closing the Gap Among IP and Per-Flow Green Routing Solutions: The Tunneling Approach Marco Polverini;Antonio Cianfrani;Angelo Coiro;Marco Listanti IEEE Journal on Selected Areas in Communications Year: 2015 | vol. 33, Issue: 12 | Journal Article | Publisher: IEEE (Year: 2015).*

Global roaming among Mobile IP networks operated by different administrative domains. Support of incoming/outgoing calls for mobile nodes having private addresses A. Idoue;T. Kubo; T. Hasegawa; M. Ohashi 2003 IEEE Wireless Communications and Networking, 2003. WCNC 2003.Year: 2003 | vol. 3 | Confer (Year: 2003).*

Route optimization for roaming heterogeneous multi-homed mobile networks Kumudu S. Munasinghe;Abbas Jamalipour 2010 4th International Conference on Signal Processing and Communication Systems Year: 2010 | Conference Paper | Publisher: IEEE (Year: 2010) (Year: 2010).*

Swedish Search Report from the Swedish Patent and Registration Office, dated May 27, 2020, for Swedish Patent Application 2050610-1.

Extended European Search Report, dated Oct. 29, 2021, European Patent Office, European Patent Application No. 21168679.5.

* cited by examiner

METHODS AND AN APPARATUS FOR ROUTING DATA PACKETS IN A NETWORK TOPOLOGY

TECHNICAL FIELD

The present disclosure relates generally to the field of data communications, and more particularly to methods and an apparatus for routing data packets or traffic in a network topology including multiple subnetworks.

BACKGROUND

Many networks include multiple subnetworks or subnets and datacenters including a plurality of network nodes, such as servers, and often the nodes need to communicate with one another. Additionally, in such networks, it may be desirable to move a node from a subnet in a home network to a subnet in another network, or to move from its original location to another location either physically or logically. One reason may be due to migration of servers from one location to another location while still providing the services to users. For example, an Internet server may provide services such as servicing and managing requests for hypertext mark-up language (HTML) Web pages, providing and managing access to databases, providing and managing access to News servers, Multimedia (including video and audio) servers, and Mail servers, as well as managing access to and functioning of e-commerce services. Some servers route such requests to an appropriate computer within a cluster of computers, each of which performs one of these server functions.

It is, however, a challenging task in networking to move one or more host nodes or servers from one subnet to another subnet while allowing the subnets to continue to work seamlessly, and host nodes in different subnets to communicate with each other after the move. One of the challenges is how to allow the host node in a home network to keep its Internet Protocol (IP) address unchanged even after the move of the host node to a visited network.

SUMMARY

It is an object of embodiments herein to provide a solution for routing traffic and support moving a host node or a server from one subnet to another subnet while the IP address of the host node remains unchanged in both subnets, i.e., the host node keeps its original IP address even after moving or roaming to a new subnet in a visited network.

According to an aspect of embodiments herein, there is provided a method for enabling routing of traffic to/from a roaming host node roaming from a subnet of a home network to a visited network, wherein the roaming host node is assigned an Internet Protocol (IP) address in the home network, the method comprising: configuring, in a router of the visited network to which the roaming host node is connected, a subnet by assigning an IP address range to the subnet, wherein the assigned IP address range is the same IP address range of the subnet of the home network; creating or configuring a tunnel between a router of the home network and the router of the visited network; creating or configuring, in the router of the home network, a static route to route traffic from a host node, destined to the roaming host node wherein the traffic is routed through the tunnel and delivered to the roaming host node through a first connected interface to the visited network, on the router of the visited network, and wherein the IP address of the roaming host node is maintained unchanged in the subnet of the visited network; and configuring the router of the visited network by applying a routing policy, wherein the routing policy enables the roaming host node to reply to received traffic from said host node received from said first interface and to route traffic from the roaming host node through a network interconnecting the router of the visited network and the router of the home network.

According to another aspect of embodiments herein, there is provided a router in a visited network, for enabling routing of traffic to/from a roaming host node roaming from a subnet of a home network to the visited network, wherein the roaming host node is assigned an IP address in the home network, the router comprising a processor and a memory containing instructions executable by said router wherein the router is configured to: configure, a subnet by assigning an IP address range to the subnet, wherein the assigned IP address range is the same IP address range of the subnet of the home network; create or configure a tunnel between a router of the home network and the router of the visited network. The router of the home network, being configured with a static route to route traffic from a host node, destined to the roaming host node wherein the traffic is routed through the tunnel and delivered to the roaming host node through a first connected interface to the visited network, on the router of the visited network, and wherein the IP address of the roaming host node is maintained unchanged in the subnet of the visited network. The router is further configured or adapted to apply a routing policy, wherein the routing policy enables the roaming host node to reply to received traffic from said host node received from said first interface and to route traffic from the roaming host node through a network interconnecting the router of the visited network and the router of the home network.

According to another aspect of embodiments herein, there is provided a method performed by a router in/of a visited network, for enabling routing of traffic to/from a roaming host node roaming from a subnet of a home network to the visited network, wherein the roaming host node is assigned an IP address in the home network, the method comprising: configuring, in the router of the visited network to which the roaming host node is connected, a subnet by assigning an IP address range to the subnet, wherein the assigned IP address range is the same IP address range of the subnet of the home network; creating or configuring a tunnel between a router of the home network and the router of the visited network; wherein a static route is created or configured in the router of the visited network, to route traffic from a host node, destined to the roaming host node wherein the traffic is routed through the tunnel and delivered to the roaming host node through a first connected interface to the visited network, on the router of the visited network, and wherein the IP address of the roaming host node is maintained unchanged in the subnet of the visited network; and configuring the router of the visited network by applying a routing policy, wherein the routing policy enables the roaming host node to reply to received traffic from said host node received from said first interface and to route traffic from the roaming host node through a network interconnecting the router of the visited network and the router of the home network.

An advantage with embodiments herein is to allow for a seamless mobility of a node from one subnet to another subnet while maintaining the IP address of the host node unchanged.

Additional advantages achieved by the embodiments of the present invention will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

It should be noted that the embodiments herein may be employed in any network topology involving any number router devices, subnets, host nodes, switches, etc. Also, any suitable routing protocol may be used.

Figure 1:
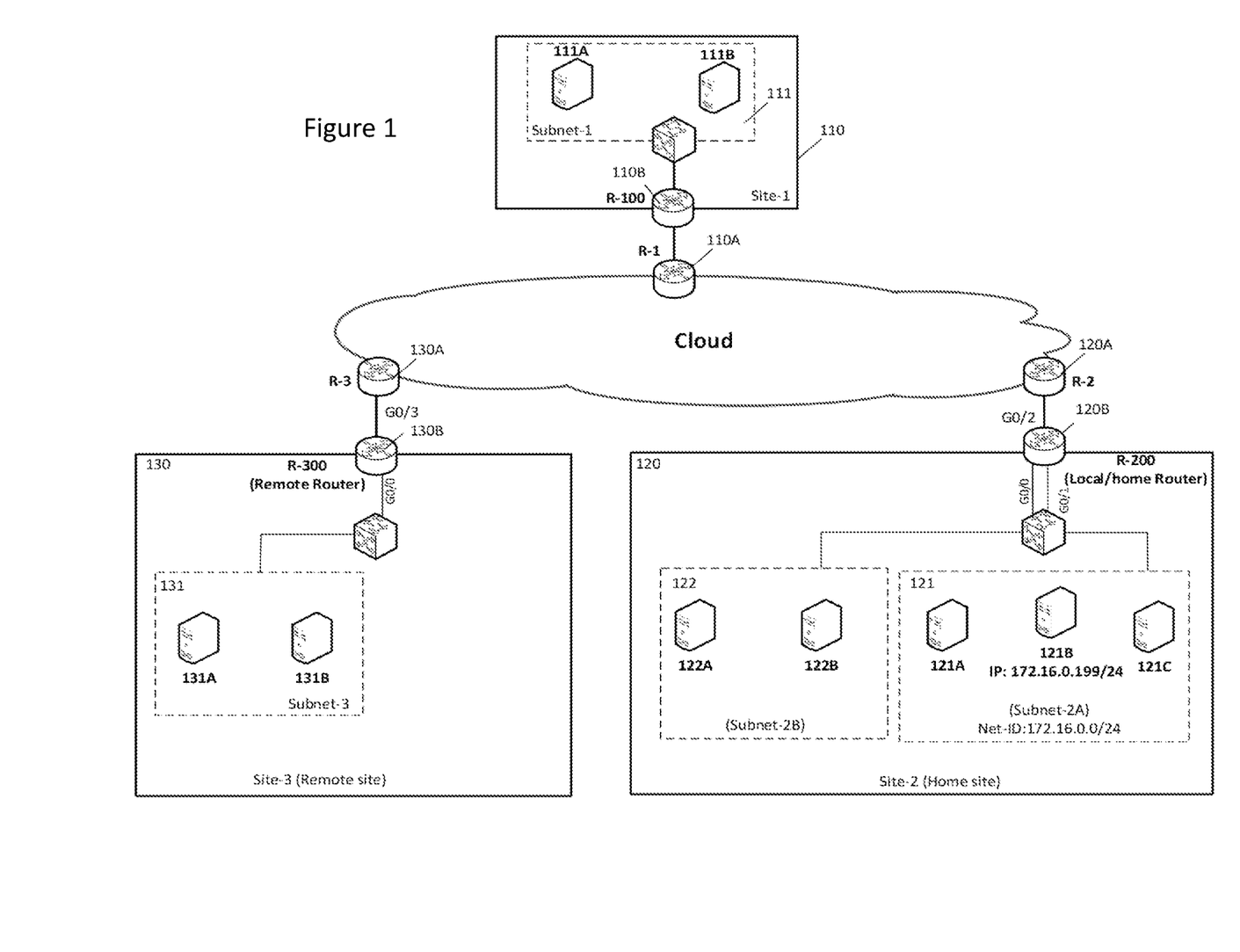
FIG. 1 is an example of a network scenario involving routers, network host nodes and subnets.

Reference is now made to FIG. 1 which is a simplified drawing illustrating a communication network topology including a plurality of sites (or networks), servers or host nodes, subnets, routers and switches.

As seen in FIG. 1, three networks or three sites: Site-1 110, Site-2, 120, Site-3 130 are connected to each other by means of router devices and communicably connected to each other via a network. Each site is shown including at least one subnet which in turn includes servers or host nodes. An example of a network is a cloud-based network. Instead of a cloud, a wide area network (WAN) or a local area network (LAN) or a combination of a cloud, WAN and LAN may be used. A cloud is an example of a network infrastructure to make connection between different sites. Sites 110, 120 and 130 are connected to the cloud through one or more routers. For example, Site-1 110, Site-2 120 and Site-3 130 are connected to the cloud (or to a network) through routers 110A (R-1), 120A (R-2) and 130A (R-3) respectively. Each site includes one or more subnets (or networks). Site-1 110 includes Subnet-1 111, Site-2 120 includes Subnet-2A 121 and Subnet-2B 122, and Site-3 is shown including Subnet-3 131. The subnets are shown connected through one or more switches and routers 110B (R-100), 120B (R-200) and 130B (R-300), to the cloud (or an interconnecting network).

Each subnet includes one or more host nodes, and each subnet has a unique IP address range. The host nodes in a subnet are assigned an IP address within the IP address range of the subnet. As shown, Subnet-1 111 includes two host nodes (or servers) 111A and 111B. Subnet-2A 121 includes three host nodes 121A, 121B and 121C, Subnet-2B includes host nodes 122A and 122B and Subnet-3 131 includes two host nodes 131A and 131B.

It is appreciated that the embodiments herein are not restricted to any number of sites, subnets, host nodes, routers, switches, etc.

Assuming now that host node 121B in subnet-2 121 of Site-2 120 roams to Site-3 130. For easier understanding of the teaching of the embodiments herein, the following terminology is used:

Home network: This is the original place of host node 121B in subnet 121 of the home network or home site, i.e., before the roaming takes place. The home network (or home site) corresponds to Site-2 120. An example of the IP address range of subnet 121 is also shown (172.16.0.0/24). This may also be called a network-ID (Net-ID). The IP address of host node 121B in the home network is also shown 172.16.0.199/24.

Visited network: This is the place or site to which the host node 121B roams to. The visited network corresponds to Site-3 130. The visited network may also be called a remote site.

Roaming host node: This corresponds to host node 121B after it has roamed from the home network 120 to the visited network 130.

Router of the home network: This corresponds to router 120B (R-200) in Site-2 120. This may also be called the local router or the home router.

Router of the visited network: This corresponds to router 130B (R-300) in Site-3 130. This may be called the remote router.

Home host nodes: This corresponds to host nodes 122A, 122B, 121A and 121C.

Cloud host nodes: These nodes which are not part of Site-2 120 or Site-3 130. For example, host nodes 111A and 111B are cloud host nodes.

Remote host nodes: These nodes which are in subnet-3 131, for example, host nodes 131A and 131B are remote host nodes.

Figure 2:
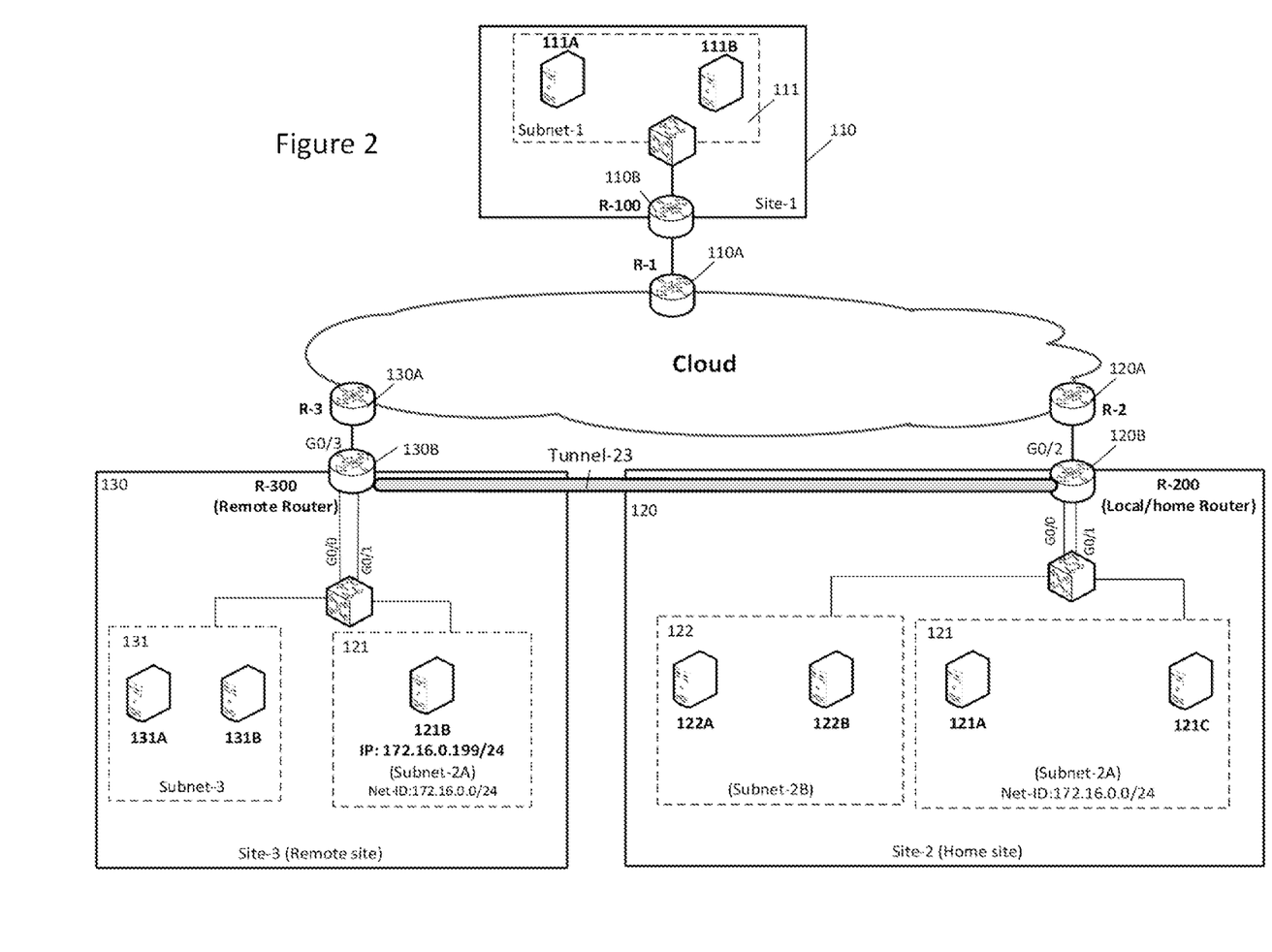
FIG. 2 is another example of a network scenario or system involving routers, network host nodes and subnets wherein the embodiments herein may be applied.

FIG. 2 illustrates the communication network topology of FIG. 1 after the roaming of host node 121B from the home network 120 to the visited network 130. Hence, roaming host node 121B is connected to the visited network 130 or to the router 130B of the visited network 130. It should be noted that although there are no "lines" showing connection(s) of the host nodes to the respective router(s), directly or via switch devices, it is understood that the host devices are connectable or are connected to respective router directly or indirectly via a switch device, through a fixed connected or a wireless connection. For example, the roaming host node 121B is connectable to the router 130B of the visited network 130 either directly or via a switch or suitable network device. The same applies for the other host nodes and there connections to respective router (directly or indirectly, fixed, or wireless connection). The sites, and/or subnets may belong to the same network operator or to different network operators.

The router 130B (or R-300) of the visited network 130 has a default gateway to send traffic to cloud router 130A (R-3). Similarly, the router 120B (or R-200) in the home network 120 has a default gateway to send traffic to cloud router 120A (R-2). So when traffic is sent via the cloud the routers 120A and 130A may be configured to forward traffic to respective cloud router. An example of configuration may be:

R-200 #
Default route: forward all→R-2
R-300 #
Default route: forward all→R-3

Router 130B (or R-300) may send traffic to router 120A (or R-200) and use the following configuration of a static route:
R-300 #
Static Route: destined R-200→R-3

According to an embodiment herein, the method includes configuring, in the router 130B of the visited network 130, a subnet by assigning an IP address range, wherein the IP address range is the same as the IP address range of the subnet 121 of the home network 120. Hence, the assigned IP address range to this new subnet is 172.16.0.0/24. This new subnet hence can be denoted Subnet-2 121 in the visited network 130 because it has the same IP range as subnet 121 of the home network 120. The roaming host node 121B keeps it original IP address 172.16.0.199 in this new subnet 121 in the visited network 130. This is shown in FIG. 2 wherein the roaming host node 121B maintains it IP address unchanged within the new subnet 121 in the visited network 130.

There are several reasons why the roaming host node should keep its IP address unchanged. For example, if the roaming host node is a DNS (Doman Name System) server, it is important that the IP address of this server is kept unchanged, otherwise the IP configuration, in each client or host device using the IP address of this DNS server, must be updated and usually this needs to be done manually, which is cumbersome and time consuming for the users. Another reason could be that applications and licenses installed in the host node are tied to the IP address of the host node. Hence, if the IP address of the host node changes, the applications may not work anymore, or the license(s) may not be valid anymore.

According to embodiments herein, a tunnel is created between the router 120B of the home network 120 and the router 130B of the visited network 130, and a static route is configured or created in the router 120B of the home network 120 to point to the tunnel and to route traffic destined to the roaming host node 121B, through the created tunnel. The tunnel, denoted Tunnel-23 is illustrated in FIG. 2.

An example of the configuration of the static route in the home router 120B (R-200), used to route packets to the roaming host node 121B through Tunnel-23 is shown below:
R-200 #
ip route 172.16.0.199/32→Tunnel23

Another example of a configuration of the tunnel between router R-200 and R-300 in router R-200 and R-300 respectively is shown below.
R-200 #
Interface Tunnel23
ip address 51.51.51.1/24
tunnel source R-200
tunnel destination R-300
R-300 #
interface Tunnel23
ip address 51.51.51.3/24
tunnel source R-300
tunnel destination R-200

According to an embodiment and as mentioned, a static route is created or configured in the router 120B of the home network 120, to route traffic from a host node (e.g. 111A, or 121A or 122A) destined to the roaming host node 121B, wherein the traffic is routed through Tunnel-23 and delivered to the remaining host node 121B through a first connected interface to the visited network 130, on the router 130B or the visited network 130, and wherein the IP address of the roaming host node is maintained unchanged.

Hence, when the router 120B (or R-200) of the home network 120 receives traffic destined to the roaming host node 121B, the traffic is routed through Tunnel-23 and the traffic is delivered to the roaming host node 121B through a first connected interface (G0/1) to the subnet 121 of the visited network 130, on the router 130B of the visited network 130, and wherein the IP address of the roaming host node 121B is maintained unchanged in the subnet 121 of the visited network 130. So when the traffic (or packet(s)) it reaches the router 130B of the visited network 130, and since the destination IP address of the roaming host node 121B is part of the subnet 121 in the visited network 130, the traffic is delivered to the roaming host node 121B.

For example, assume host node or cloud node 111A in Site-1 110 sends traffic destined to the roaming host node 121B. When traffic reaches the router 120B of the home network 120, this router checks if the destination IP address matches with any of the IP addresses defined in a routing table of router 120B. That being the case, the router 120B of the home network 130 forwards the traffic (or packet) through Tunnel-23 and when the traffic arrives at the router 130B of the visited network 130, this router forwards the traffic or packet to the interface which the subnet 121, in the visited network 130, is connected to (e.g. interface G0/1) and the roaming host node 121B receives the traffic or packet.

Assume that a source host node (e.g., 121A) in the subnet 121 of the home network 120 wants to communicate with the destination host node (roaming host node 121B) having address 172.16.0.199, and the source host node 121A generates an ARP (Address Resolution Protocol) request. The source host node 121A is in subnet 121, (172.16.0.0/24) of the home network 120. The destination host node 121B is also in subnet 121, (172.16.0.0/24) but in the visited network 130. These two host nodes are hence considered to belong to the same subnet (172.16.0.0/24) and therefore this subnet is denoted 121 in both the home network 120 and in the visited network 130.

Normally, a router accepts an ARP request if the router sees its own Medium Access Medium (MAC) address in the destination part of the ARP request, or the destination address indicated in the ARP request includes a broadcast address (e.g. FF:FF:FF:FF:FF:FF) while the router has a route in its routing table to the destination IP address indicated in the ARP request.

According to an embodiment herein, since a static route is created or configured in the home router 120B, this router accepts the ARP request packet and forwards it through Tunnel-23 based on the created static route:
ip route 172.16.0.199/32→Tunnel23.

The traffic or packet reaches router 130B (R-300) of the visited network 130 and since the destination IP address (172.16.0.199) is within the IP address range (172.16.0.0/24) of the subnet 121 in the visited network 130, the router 130B forwards the traffic or packet to the roaming host node 121B using the first interface G0/1. The IP address range of the subnet 172.16.0.0/24 is (172.16.0.1) to (172.16.0.254). The first interface G0/1 is assigned to router 130B of the visited network 130, and the IP address that may be assigned to this interface may be taken from the IP range of subnet 121 which may be unique. As an example, the same IP address of the interface G0/1 on the home router 120B may be used. This is, for example, done because this IP address is the default gateway for host nodes in subnet 121 and by doing this there is no need to change the default gateway IP address of the roaming host node 121B. An example of an assignment of the IP address, in router 130B, is shown below:
R-300 #
interface G0/1
ip address 172.16.0.1/24

Interface G0/1 may be connected to the switch in the visited network 130 as shown in FIG. 2. According to an embodiment, a routing policy is configured in the router 130B of the visited network 130, which routing policy enables the roaming host node 121B to reply to received traffic from the host node, received through the tunnel Tunnel-23 and through the first interface G0/1. The traffic is routed from the roaming host node 121B through a network interconnecting routers R-300 and R-200 (e.g., though the cloud), and not through the tunnel.

An example of a routing policy that may be configured in the router 130B of the visited network is shown below:
R-300 #
Policy routing "ReplyBack_to_OtherNode"
Action: send all→R-3
interface G 0/1
ip address 172.16.0.1 255.255.255.0
Apply policy ReplyBack_to_OtherNode So the policy enables to redirect traffic that arrives via G0/1, from the roaming host node 121B, to router R-3 130A which, in this example, is the gate to the cloud having the route to reach the home subnet. An example of "OtherNode" may be a home node 121A or 122A or a cloud host node 111A or 111B. By applying the routing policy it is not necessary to define or configure a static source in the router 130B of the visited network 130 to reach the home network 120 wherein the router 120B resides. Further, this policy is at an interface level and not at a router level, so none of arriving traffic through the tunnel, meet this policy. Additionally, the policy routing will not meet to any traffic coming through the Tunnel-23 to the router R-300 130B because the policy is configured or placed in Interface G0/1 outgoing way. Outgoing way means that the policy is applied only to traffic which arrive from connected subnet 121 (wherein the roaming host node 121B resides) to the router 130B on interface G0/1.

Hence, when the roaming host node 121B received traffic through interface G0/1 (and the tunnel), the roaming host node 121B generates a reply to this received traffic by setting a MAC (Medium Access Control) address of the interface G0/1 as a Layer 2 destination MAC address part of the packet (of the traffic), and the traffic or packet is forwarded to the interface G0/1. The router 130B (or R-300) receives this packet and checks the destination IP address. In a default situation, the router 130B does not forward the packet anywhere because the range of the destination IP address of the packet is the same as the IP address of the router's directly connected interface (G0/1). To bypass this default behavior, the routing policy is applied to incoming packet(s) on interface G0/1 to forward or route traffic directly to (cloud router) R-3 130A, and not through the tunnel Tunnel-23.

Figure 3:
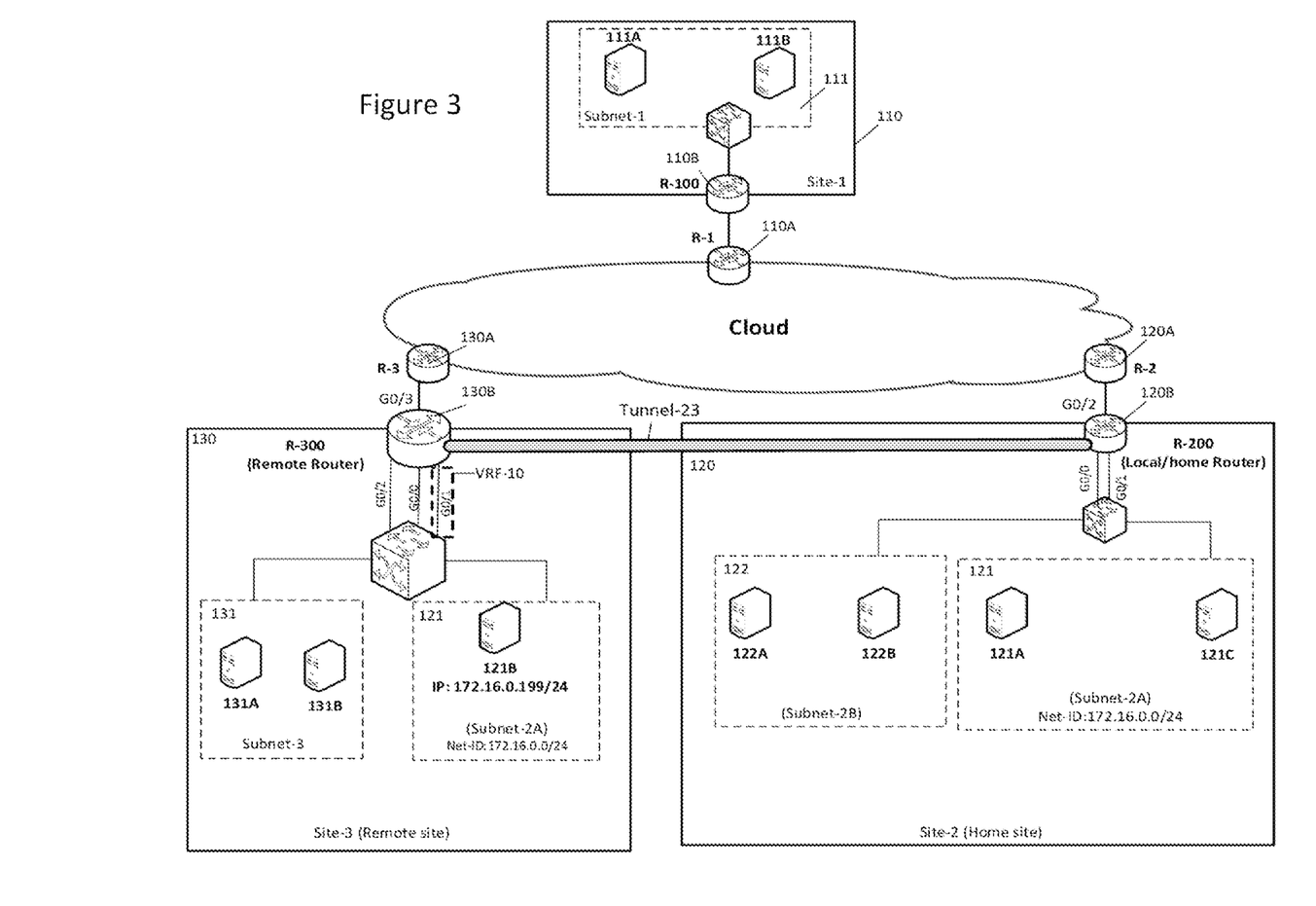
FIG. 3 is another example of a network scenario or system involving routers, network host nodes and subnets wherein the embodiments herein may be applied.

For enabling the roaming host node 121B to initiate a connection to any home host node (e.g., 121A or 122C), the following configurations may be applied. According to an embodiment, a first VRF (Virtual Routing and Forwarding) is created or configured in the router 130B of the visited network 130. FIG. 3 illustrates a network scenario involving a VFR, denoted VRF-10.

VRF is a technology implemented in a network apparatus or in a network device such as a router device that enables the creation of operation of multiple instances of a routing table simultaneously. VRF enables the router to configure the instances of router within it, each of which operates separately and has its distinct and overlapping set of Internet Protocol (IP) addresses. VRF can also be called Virtual Router and Forwarder. VRF works like a typical router with its unique routing table, table entries and routing protocols and may also be used to create VPN (Virtual Private Network) tunnels.

Referring back to FIG. 3, and according to an embodiment, the method comprises, assigning the first interface (G0/1) of the router 130B in the visited network 130 to the first VRF (VRF-10). None of the other interfaces in the router 130B is part of VRF-10. The method further comprises, assigning a tunnel end point on the router 130B to VRF-10; and importing routers from at least one routing table of router 130B in the visited network to a VRF table of VRF-10.

The configuration of VRF-10, as mentioned above, is performed by importing routes from the routing table of the router 130B which has the default route to the rest of the subnets or networks in the cloud. As an example, interfaces G0/0 and G0/3 may be part of the default routing table. Importing the route from the default routing table to the VRF table of VRF-10 enables communication between the roaming host node 121B to any other subnet/host node outside of VRF-10 when the roaming host node 121B is the initiator of the traffic. As an example, traffic towards Subnet-3 131 which is shown connected to interface G0/0 or traffic towards Subnet-1 111 which is connected to R-100, or R-3.

It should be noted that the first VRF, VRF-10, does not export its routing table to any other routing table. An example of a configuration in router 130B on how to import the routing table is shown below:
R-300 #
vrf VRF-10
rd 1234:10
import route from default_routing_table An example of an assignment of an end point of the tunnel, Tunnel-23, on the router 130B, to VRF-10 is shown below:
R-300 #
interface Tunnel23
vrf VRF-10

Since Tunnel-23 is now in separate VRF (VRF-10) with the default VRF, another reason to import R-300's routing table into the VRF-10 is that Tunnel-23 uses a route on R-300 130B to establish its connection to the other end point of the tunnel on R-200 120 B.

According to an embodiment, interface G0/1 may be assigned to VRF-10:
R-300 #
interface G0/1
vrf VRF-10
ip address 172.16.0.1 255.255.255.0

According to an embodiment, the method comprises, configuring a second interface on the router 130B of the visited network 130; assigning an IP address to the second interface from the IP address range of the subnet 121 of the visited network 130; selecting a subnet mask which is shorter that the subnet mask of the subnet 121 of the visited network 130; connecting the second interface to a switch in the visited network 130; and creating or configuring a static route in the router 130B of the visited network 130 to route traffic destined to the subnet 121 of the home network to a router 130A (R-3) connected to said network or cloud.

FIG. 3 illustrates the second interface, denoted G0/2, which is shown connected to subnet 121 in the visited network 130. This interface G0/2 may be defined either as a sub-interface under a physical interface or created separately under a (free) physical interface. An IP address from the same IP address range of subnet 121, may be assigned to interface G0/2. However, as mentioned above, the subnet mask should be shorter and different from subnet mask of subnet 121. The IP address should be unique. As previously described, interface G0/1 and G0/2 are in different interfaces or different VRFs on router 130B. As an example, if subnet 121 uses /24 as subnet mask, interface G0/2 may use a subnet mask such as /23, /22, . . . , /16 etc. An example configuration is shown below:

R-300 #
interface G0/2
ip address 172.16.0.200/16

Creation or configuration of the static route in router 130B (or R-300), to send traffic destined to subnet 121 of the home network 120 to router 130A (or R-3) is presented below:

R-300 #
Static Route: Destined 172.16.0.0/24→R-3

When the roaming host node 121B initiates a connection to a host node (e.g. 121A), the moving host node 121B generates an ARP (address resolution protocol request) to find out the MAC address of the host node (e.g. 121A). Since the source address and the destination address are with the same subnet (subnet 121), the destination MAC address of the ARP request is a layer 2 (L2) broadcast address (FF:FF:FF:FF:FF:FF). Further, since this is an L2 broadcast, the host nodes in the same L2 domain and interface G0/1 and interface G0/2 of router 130B also receive this ARP request packet. Interface G0/1 cannot do anything with this received request, but G0/2 accepts the ARP request packet because it has a more specific route (static route) to match the destination IP address of the ARP packet.

Figure 4:
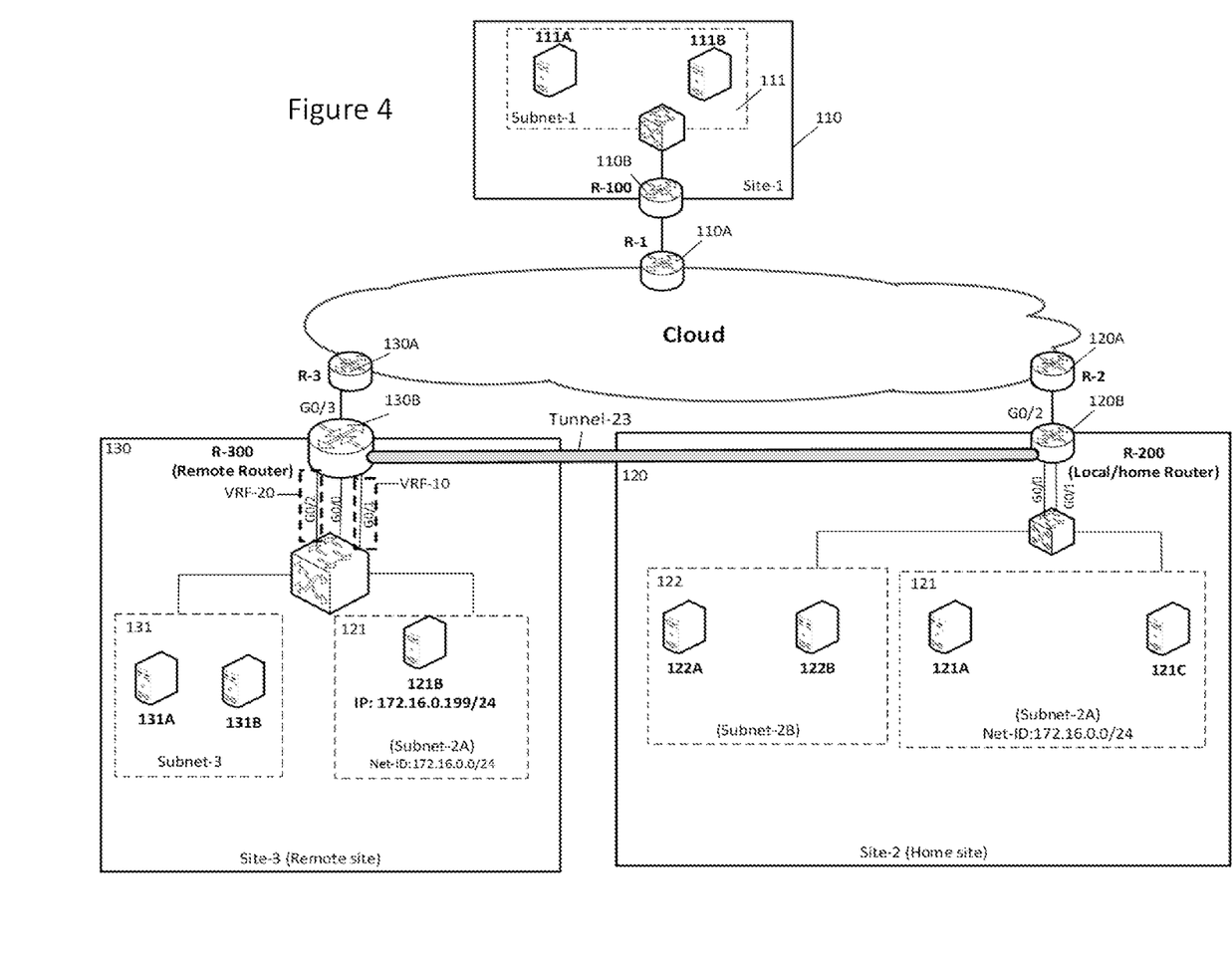
FIG. 4 is another example of a network scenario or system involving routers, network host nodes and subnets wherein the embodiments herein may be applied.

According to an embodiment, the method comprises, creating or configuring a second VRF (VRF-20) in the router 130B of visited network 130; assigning the second interface (G0/2) of the router 130B in the visited network 130 to the second VRF (VRF-20), wherein none of the other interfaces in the router 130B of the visited network 130 is part of the second VRF (VRF-20); importing routes from at least one routing table of the router 130B in the visited network 130 to a VRF table of the second VRF (VRF-20); and adding the created or configured static route to the VRF table of the second VRF (VRF-20). FIG. 4 illustrates a network scenario involving VRF-20 in addition to VRF-10.

The configuration of VRF-20 in router 130B is exemplified below:

R-300 #
vrf VRF20
rd 1234:20
import route from default_routing_table

It should be mentioned that VRF-20 does not export its routing table to any other routing table. Assigning the second interface G0/2 to this VRF-20 may be achieved using the following commands in router 130B:

R-300 #
interface G0/2
vrf VRF-20
ip address 172.16.0.200 255.255.0.0

Adding the configured static route to VRF-20 may be done as follows:

R-300 #
Static Route (VRF-20): Destined 172.16.0.0/24→R-3

The reason to import or add the static route from a default routing table into VRF-20 is to route the necessary route to reach router 130A (or R-3).

As mentioned earlier, the subnet 121 is isolated from the other subnets configured in the router 130B of the visited network 130. The reason for this is that if subnet-2 121 is in the same routing table with any other subnets in the remote router 130B, then there is no possibility for any other subnet in the remote network 130, like subnet-3 131, to access a host node in the home network, e.g. in subnet 121 of home network 120. This is because the router 130B in the visited network doesn't forward such traffic outside of the router when there is already a directly connected interface or a most specific route situation (static route) in the routing table for Subnet-2 121.

To solve this issue, interface G0/2 is added or moved from the default VRF to VRF-20. Interface G0/1 is already in VRF-10, as shown in FIG. 4. Hence subnet-2 121 is isolated from any other subnet at router 130B.

Further, G0/1 and G0/2 should not be in the same VRF because traffic from any none-roaming host node arrives from Tunnel-23 to VRF-10, and we also have a static route for 172.16.0.0/24 to send out traffic from roaming host node 121B to home host node (e.g. 121A). If instead both interfaces and their routing table are put in the same VRF, then a loop for coming packet through Tunnel-23 may occur. Interface G0/1 (or sub-interface) and interface G0/2 (or sub-interface) are in different physical interfaces.

It should be mentioned that it is possible to change the static route for subnet-121 on router 130B to point to the Tunnel-23 instead of to R-3 130A.

R-300 #
Static Route (VRF-20): Destined 172.16.0.0/24→Tunnel23
Further it is also possible to change the routing policy to forward traffic to Tunnel-23 instead of interface G0/3:
R-300 #
Policy routing "ReplyBack_to_OtherNode"
Action: send all→Tunnel23

Figure 5:
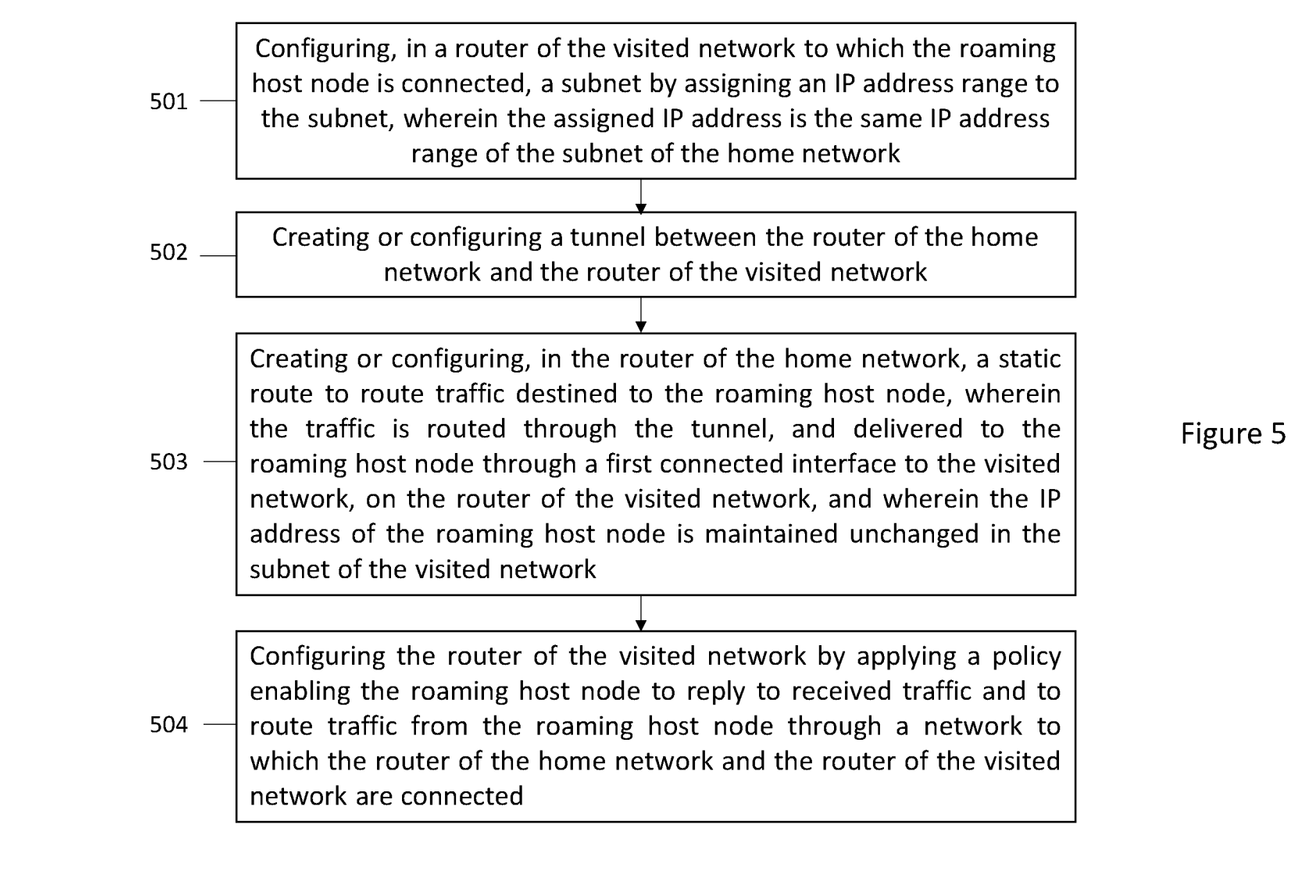
FIG. 5 illustrates a flowchart of a method according to some embodiments herein.

To summarize some of the embodiments previously described, FIG. 5 illustrates a method for enabling routing of traffic to/from a roaming host node 121B roaming from a subnet 121 of a home network 120 to a visited network 130, wherein the roaming host node 121B is assigned an IP, address in the home network 120, the method comprising:

configuring 501, in a router 130B of the visited network 130 to which the roaming host node 121B is connected, a subnet 121 by assigning an IP address range to the subnet 121, wherein the assigned IP address range is the same IP address range of the subnet of the home network 120;

creating or configuring 502 a tunnel between a router 120B of the home network 120 and the router 130B of the visited network 130;

creating or configuring 503, in the router 120B of the home network 120, a static route to route traffic from a host node, destined to the roaming host node 121B wherein the traffic is routed through the tunnel and delivered to the roaming host node 121B through a first connected interface to the subnet 121 in the visited network 130, on the router 130B of the visited network 130, and wherein the IP address of the roaming host node 121B is maintained unchanged in the subnet 121 of the visited network 130; and configuring 504 the router 130B of the visited network 130 by applying a routing policy, wherein the routing policy enables the roaming host node 121B to reply to received traffic from said host node received from said first interface and to route traffic from the roaming host node 121B through a network interconnecting the router 130B of the visited network 130 and the router 120B of the home network 120.

According to an embodiment, the method comprises, creating or configuring a first VRF (VRF-10) in the router of the visited network; assigning the first interface (e.g. G0/1) to the first VRF, wherein none of the other interfaces in the router 130B is part of VRF-10; assigning a tunnel end point on the router 130B to VRF-10; and importing routes from at least one routing table of the router 130B to a VRF table of VRF-10.

According to an embodiment, importing routes to the VRF table is performed for establishing a session between two end points of the tunnel.

There are several reasons why the VRF-10 imports the routing table(s) from the default routing table of router 130B. One reason is to allow routing of traffic from the roaming host node 121B to at least one host node (e.g., host node 131A) in another network (e.g., Subnet-3 131), except in the home network 120, when said at least one host node is the initiator of a communication with the roaming host node 121B. Another reason would be to establish a session between two ends of Tunnel-23. Yet another reason is to route traffic from the roaming host node 121B to at least one host node in another network, except in the home network 120, when the roaming host node 121B is the initiator of a communication with said at least one host node (e.g. host node 131A), or when the roaming host node 121B replies back to a traffic initiated by another host node (e.g. host node 131A).

According to another embodiment, and as previously described the method further comprises, configuring a second interface (e.g. G0/2) on the router 130B of the visited network 130; assigning an IP address to the second interface from the IP address range of the subnet 121 of the visited network 130; selecting a subnet mask which is shorter that the subnet mask of the subnet 121 of the visited network 130; connecting the second interface to a switch in the visited network 130; and creating or configuring a static route in the router 130B of the visited network 130 to route traffic destined to the subnet 121 of the home network to a router 130A (R-3) connected to said network (or cloud).

According to another embodiment, the method may further comprise, creating or configuring a second VRF (VRF-20) in the router 130B of visited network 130, assigning the second interface (e.g. G0/2) of the router 130B in the visited network 130 to the second VRF (VRF-20), wherein none of the other interfaces in the router 130B of the visited network 130 is part of the second VRF (VRF-20); importing routes from at least one routing table of the router 130B in the visited network 130 to a VRF table of the second VRF (VRF-20); and adding the created or configured static route to the VRF table of the second VRF (VRF-20).

Figure 6:
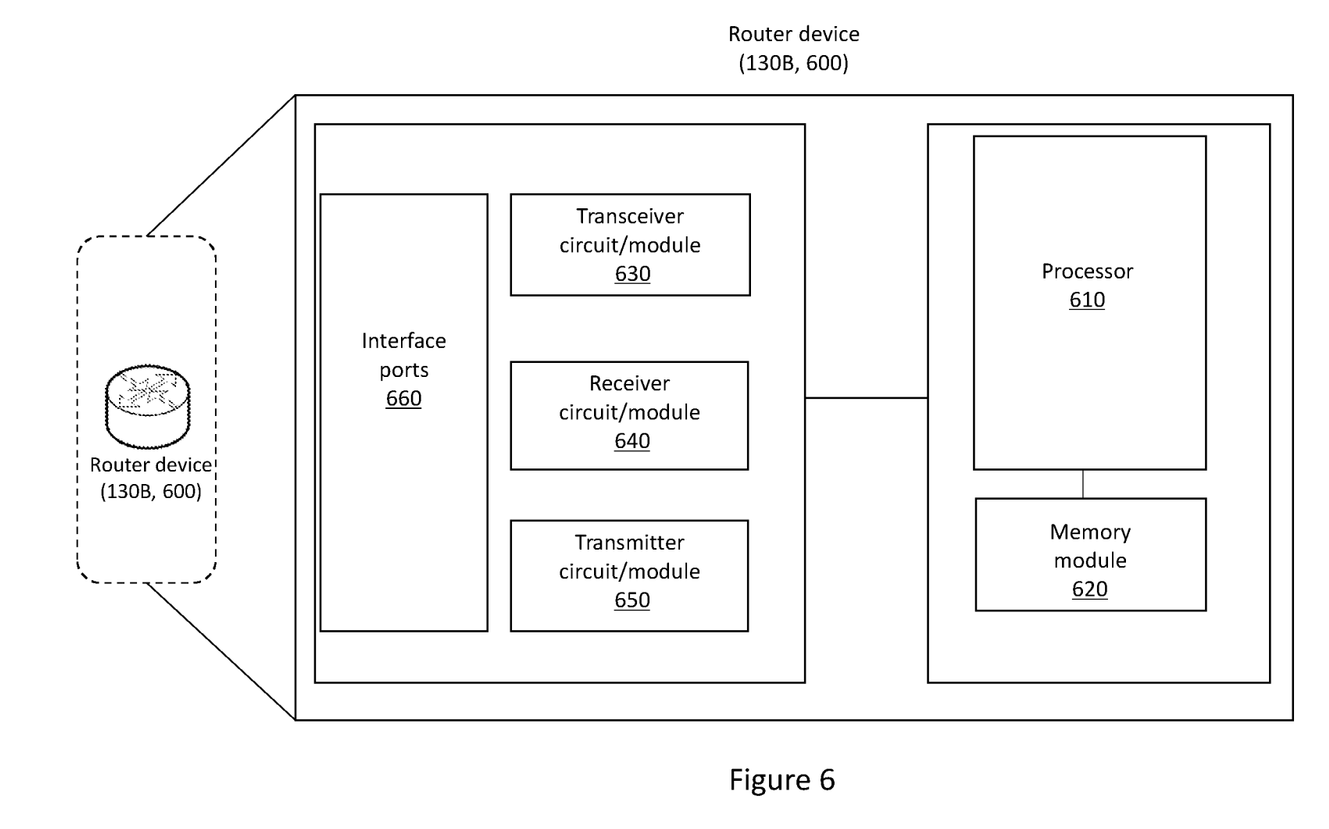
FIG. 6 illustrates a block diagram of a router device according to some embodiments herein.

There is also provided a router 131B, 600 in a visited network for enabling routing of traffic to/from the roaming host node 121B, (see FIG. 6). The router 130B, 600 comprising a processor 610 and a memory 620 containing instructions executable by said router 130B, 600 wherein the router 130B, 600 is configured to: configure a subnet 121 by assigning an IP address range to the subnet 121, wherein the assigned IP address range is the same IP address range of the subnet 121 of the home network 120; create or configure a tunnel between a router 120B of the home network 120 and the router 130B, 600 of the visited network 130; the router 120B of the home network 120, being configured with a static route to route traffic from a host node, destined to the roaming host node 121B wherein the traffic is routed through the tunnel and delivered to the roaming host node 121B) through a first connected interface to the visited network 130, on the router 130B, 600 of the visited network 130, and wherein the IP address of the roaming host node 121B is maintained unchanged in the subnet 121 of the visited network 130; and configure 504 the router 130B, 600 of the visited network 130 by applying a routing policy, wherein the routing policy enables the roaming host node 121B to reply to received traffic from said host node received from said first interface and to route traffic from the roaming host node 121B through a network interconnecting the router 130B, 600 of the visited network 130 and the router 120B of the home network 120.

Additional actions or operations performed by the router 131B, 600 have already been described.

As described the router 130B, 600 comprises a processing circuitry or a processing module or a processor 610; a memory module 620; a receiver circuit or receiver module 640; a transmitter circuit or a transmitter module 650 and a transceiver circuit or a transceiver module 630 which may include transmitter circuit 650 and receiver circuit 640. The router device 130B, 600 is also shown including an interface port system 660 which may include a plurality of interfaces as previously described. The processor 610 is configured to execute program instructions from a computer program stored in a non-transitory computer-readable medium that is, or is accessible to the processing circuitry. Here, "non-transitory" does not necessarily mean permanent or unchanging storage, and may include storage in working or volatile memory, but the term does connote storage of at least some persistence. The execution of the program instructions stored in the memory module 620 specially adapts or configures the processor 610 to carry out the operations of the router network node 600 disclosed herein. Further, it will be appreciated that the router device 130B, 600 may comprise additional components not shown in FIG. 6. The method performed by router 600 have already been described and a summary is described in the pending claims.

There is also provided a computer program comprising instructions which when executed on at least one processor of the router of the visited network, cause the at least one processor 610 (of the router 600) to carry out the method or procedure related to the router of the visited network, as previously described.

The embodiments herein are not restricted to any number of sites, subnets, host nodes etc. Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A method for enabling routing of traffic at least one of to and from a roaming host node roaming from a subnet of a home network to a visited network, the home network having a plurality of host nodes, the roaming host node being assigned an Internet Protocol (IP) address in the home network, the method comprising:

configuring, in a router of the visited network to which the roaming host node is connected, a subnet, by assigning an IP address range to the subnet, the assigned IP address range being the same IP address range of the subnet of the home network;

creating or configuring a tunnel between a router of the home network and the router of the visited network;

creating or configuring, in the router of the home network, a static route to point to the tunnel to route traffic from a host node of the plurality of host nodes located in the home network destined to the roaming host node located in the visited network, the roaming host node corresponding to a host node after it has roamed from the home network to the visited network, the traffic being routed through the tunnel and delivered to the roaming host node through a first connected interface to the visited network on the router of the visited network, and the IP address of the roaming host node being maintained unchanged in the subnet of the visited network; and configuring the router of the visited network by applying a routing policy, the routing policy enabling the roaming host node located in the visited network to reply to received traffic from said host node located in the home network, the traffic received from the tunnel via said first interface and to route traffic from the roaming host node through a network interconnecting the router of the visited network and the router of the home network, and not through the tunnel.

2. The method according to claim 1, further comprising: creating or configuring a first Virtual Route Forwarder (VRF) in the router of visited network; assigning the first interface of the router in the visited network to the first VRF, wherein none of the other interfaces in the router of the visited network are part of the first VRF; assigning a tunnel end point on the router in the visited network to the first VRF; and importing routes from at least one routing table of the router in the visited network to a VRF table of the first VRF.

3. The method according to claim 2, wherein importing routes to the VRF table is performed for establishing a session between two end points of the tunnel.

4. The method according claim 1, further comprising: configuring a second interface on the router of the visited network; assigning an IP address to the second interface from the IP address range of the subnet of the visited network; selecting a subnet mask which is shorter than the subnet mask of the subnet of the visited network; connecting the second interface to a switch in the visited network; and creating or configuring a static route in the router of the visited network to route traffic destined to the subnet of the home network to a router connected to said network.

5. The method according to claim 4, further comprising: creating or configuring a second VRF in the router of the visited network; assigning the second interface of the router in the visited network to the second VRF, wherein none of the other interfaces in the router of the visited network are part of the second VRF; importing routes from at least one routing table of the router in the visited network to a VRF table of the second VRF; and adding the created or configured static route to the VRF table of the second VRF.

6. The method according to claim 1, wherein the network interconnecting the router of the visited network and the router of the home network is a cloud-based network.

7. A router in a visited network, for enabling routing of traffic at least one of to and from a roaming host node roaming from a subnet of a home network to the visited network, the home network having a plurality of host nodes, the roaming host node being assigned an Internet Protocol (IP) address in the home network, the router comprising a processor and a memory containing instructions executable by said router, the router being configured to:

configure a subnet by assigning an IP address range to the subnet, the assigned IP address range being the same IP address range of the subnet of the home network;

create or configure a tunnel between a router of the home network and the router of the visited network;

the router of the home network being configured with a static route to point to the tunnel to route traffic from a host node of the plurality of host nodes located in the home network destined to the roaming host node located in the visited network, the roaming host node corresponding to a host node after it has roamed from the home network to the visited network, the traffic being routed through the tunnel and delivered to the roaming host node through a first connected interface to the visited network on the router of the visited network, and the IP address of the roaming host node being maintained unchanged in the subnet of the visited network; and configure the router of the visited network by applying a routing policy, the routing policy enabling the roaming host node located in the visited network to reply to received traffic from said host node located in the home network, the traffic received from the tunnel via said first interface and to route traffic from the roaming host node through a network interconnecting the router of the visited network and the router of the home network, and not through the tunnel.

8. The router according to claim 7, further configured to: create or configure a first Virtual Route Forwarder (VRF) in the router of visited network; assign the first interface of the router in the visited network to the first VRF, wherein none of the other interfaces in the router of the visited network are part of the first VRF; assign a tunnel end point on the router in the visited network to the first VRF; and import routes from at least one routing table of the router in the visited network to a VRF table of the first VRF.

9. The router according to claim 8, wherein import of the routes to the VRF table is performed for establishing a session between two end points of the tunnel.

10. The router according to claim 7, further configured to: configure a second interface on the router of the visited network; assign an IP address to the second interface from the IP address range of the subnet of the visited network; select a subnet mask which is shorter than the subnet mask of the subnet of the visited network; connect the second interface to a switch in the visited network; and create or configure a static route in the router of the visited network to route traffic destined to the subnet of the home network to a router connected to said network.

11. The router according to claim 10, further configured to: create or configure a second VRF in the router of visited network; assign the second interface of the router in the visited network to the second VRF, wherein none of the other interfaces in the router of the visited network is part of the second VRF; import routes from at least one routing table of the router in the visited network to a VRF table of the second VRF; and add the created or configured static route to the VRF table of the second VRF.

12. A method in a router of a visited network, for enabling routing of traffic at least one of to and from a roaming host node roaming from a subnet of a home network to the visited network, the home network having a plurality of host nodes, the roaming host node being assigned an Internet Protocol (IP) address in the home network, the method comprising:

configuring, in the router of the visited network to which the roaming host node is connected, a subnet by assigning an IP address range to the subnet, the assigned IP address range being the same IP address range of the subnet of the home network;

creating or configuring a tunnel between a router of the home network and the router of the visited network, a static route to point to the tunnel being created or configured in the router of the visited network to route traffic from a host node of the plurality of host nodes located in the home network destined to the roaming host node located in the visited network, the roaming host node corresponding to a host node after it has roamed from the home network to the visited network, the traffic being routed through the tunnel and delivered to the roaming host node through a first connected interface to the visited network, on the router of the visited network, and the IP address of the roaming host node being maintained unchanged in the subnet of the visited network; and configuring the router of the visited network by applying a routing policy, the routing policy enabling the roaming host node located in the visited network to reply to received traffic from said host node located in the home network, the traffic received from the tunnel via said first interface and to route traffic from the roaming host node through a network interconnecting the router of the visited network and the router of the home network, and not through the tunnel.

13. The method according to claim 12, further comprising: creating or configuring a first Virtual Route Forwarder, VRF, in the router of visited network; assigning the first interface of the router in the visited network to the first VRF, wherein none of the other interfaces in the router of the visited network is part of the first VRF; assigning a tunnel end point on the router in the visited network to the first VRF; and importing routes from at least one routing table of the router in the visited network to a VRF table of the first VRF.

14. The method according to claim 13, wherein importing routes to the VRF table is performed for establishing a session between two end points of the tunnel.

15. The method according to claim 12, further comprising: configuring a second interface on the router of the visited network; assigning an IP address to the second interface from the IP address range of the subnet of the visited network; selecting a subnet mask which is shorter that the subnet mask of the subnet of the visited network; connecting the second interface to a switch in the visited network (130); and creating or configuring a static route in the router of the visited network to route traffic destined to the subnet of the home network to a router connected to said network.

16. The method according to claim 15, further comprising: creating or configuring a second VRF in the router of visited network; assigning the second interface of the router in the visited network to the second VRF, wherein none of the other interfaces in the router of the visited network is part of the second VRF; importing routes from at least one routing table of the router in the visited network to a VRF table of the second VRF; and adding the created or configured static route to the VRF table of the second VRF.

* * * * *